(No Model.)

C. F. FORSHAW.
BED PAN.

No. 374,121. Patented Nov. 29, 1887.

ATTEST:
Percy C. Bowen
Caw B. Waller

INVENTOR:
Charles F. Forshaw
By Harding & Tichenor
his Attorneys.

UNITED STATES PATENT OFFICE.

CHARLES FREDERICK FORSHAW, OF BRADFORD, ENGLAND.

BED-PAN.

SPECIFICATION forming part of Letters Patent No. 374,121, dated November 29, 1887.

Application filed June 22, 1887. Serial No. 242,197. (No model.)

*To all whom it may concern:*

Be it known that I, CHARLES FREDERICK FORSHAW, a subject of the Queen of England, residing at Bradford, England, have invented certain new and useful Improvements in Bed-Pans, of which the following is a specification.

The object of this invention is to provide a bed-pan capable of being easily cleaned and convenient to use; and the invention consists in constructing the cover or top of the pan in the form of a lid separate from the receiver or lower part of the pan, thus making the interior of the pan readily accessible for cleaning purposes, and also in molding such lid approximately to the contour of the human body.

Figure 1:
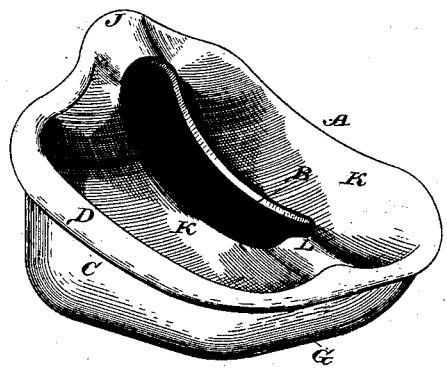
Figure 3:
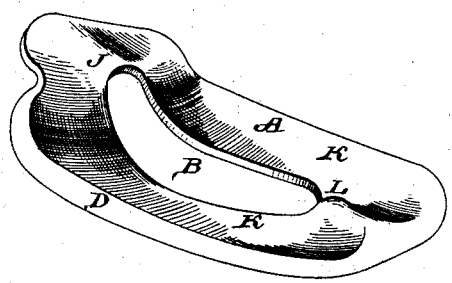
Figure 2:
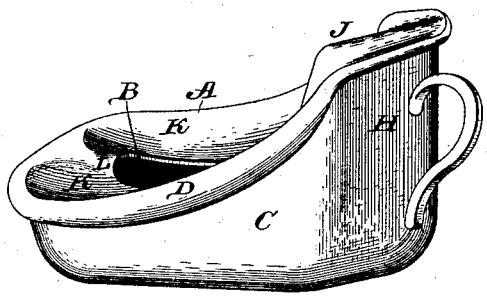
Figure 4:
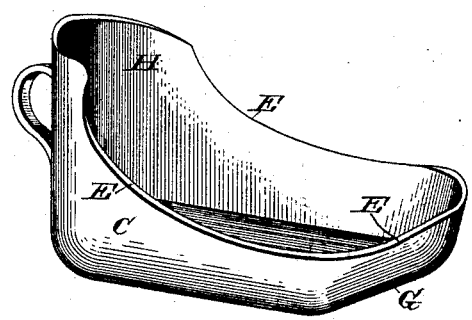

Figure 1 is a perspective view of a bed-pan constructed in accordance with my invention. Fig. 2 is a similar view of the opposite side of such pan. Fig. 3 is a separate view of the loose top or lid, and Fig. 4 is a view of the receiver or lower part of the pan.

The lid A is formed with a longitudinal opening, B, communicating with the interior of the receiver C, and the said lid has a flange, D, formed around its edge, which is adapted to engage the rim E of the said receiver and hold the lid in position thereon.

The receiver C is made shallow at the back G to facilitate its application, and the front H is raised, so as to support the lid A in an inclined position and form a guard, J, adapting it for either sex. The lid A is formed with a depression, K, on each side of the opening B, approximately corresponding to the contour of the human body. The said depressions are separated at the back by a slight ridge, L, and at the front by the above-mentioned guard.

Having now particularly described and ascertained the nature of the said invention and in what manner the same is to be performed, I declare that what I claim is—

1. The combination, in a bed-pan, of a receiver forming the lower part of the said pan and a loose cover or lid adapted to fit on said receiver and having a longitudinal opening or aperture communicating with the interior of said receiver, substantially as herein shown and described.

2. The combination, in a bed-pan, of a receiver made shallow at the back and raised in front and a lid adapted to fit on said receiver in an inclined position and having lateral depressions approximately corresponding to the contour of the human body.

In testimony whereof I have hereunto set my hand in the presence of the two subscribing witnesses.

CHARLES FREDERICK FORSHAW.

Witnesses:
DAVID NOWELL,
SAMUEL A. DRACUP.